United States Patent
Nakai (10) Patent No.: US 9,735,413 B2
(45) Date of Patent: Aug. 15, 2017

(54) BATTERY PACK TAB WELDING METHOD

(71) Applicant: Nissan Motor Co., Ltd., Yokohama-Shi, Kanagawa (JP)

(72) Inventor: Masayuki Nakai, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/319,074

(22) PCT Filed: Jun. 18, 2014

(86) PCT No.: PCT/JP2014/066101
§ 371 (c)(1),
(2) Date: Dec. 15, 2016

(87) PCT Pub. No.: WO2015/193986
PCT Pub. Date: Dec. 23, 2015

(65) Prior Publication Data
US 2017/0141374 A1    May 18, 2017

(51) Int. Cl.
| | |
|---|---|
| *B23K 26/20* | (2014.01) |
| *B23K 26/21* | (2014.01) |
| *B23K 26/323* | (2014.01) |
| *H01M 2/20* | (2006.01) |
| *H01M 2/26* | (2006.01) |
| *B23K 26/24* | (2014.01) |
| *B23K 26/06* | (2014.01) |
| *B23K 101/38* | (2006.01) |

(52) U.S. Cl.
CPC ......... *H01M 2/202* (2013.01); *B23K 26/0619* (2015.10); *B23K 26/24* (2013.01); *H01M 2/26* (2013.01); *B23K 2201/38* (2013.01)

(58) Field of Classification Search
CPC ...... B23K 26/20; B23K 26/21; B23K 26/206; H01M 2/20; H01M 2/202; H01M 2/204; H01M 2/206; H01M 2/208
USPC ............. 219/121.63, 121.64, 121.76, 121.85
See application file for complete search history.

(56) References Cited

U.S. PATENT DOCUMENTS 8,133,604 B1    3/2012 Nakahara et al.
2004/0099642 A1    5/2004 Sonoda et al.
(Continued)

FOREIGN PATENT DOCUMENTS

JP    2003305582 A    10/2003
JP    4081288 B2    4/2008
(Continued)

*Primary Examiner* — Samuel M Heinrich
(74) *Attorney, Agent, or Firm* — Young Basile Hanlon & MacFarlane, P.C.

(57) ABSTRACT

A positive electrode tab and negative electrode tab of a battery pack are configured by stacking a plurality of single cells each of which has positive electrode tab and negative electrode tab drawn outward and formed of metals different from each other in kind. In a welding method, clad material is disposed between positive electrode tab of second single cell and negative electrode tab of first single cell. Next, with a laser welder, focal point is aimed at interface between negative electrode tab and clad material, and laser is applied thereto from the side of negative electrode tab. Then, focal point is aimed at interface between positive electrode tab and clad material, and laser is applied thereto from the side of positive electrode tab.

5 Claims, 6 Drawing Sheets (56) References Cited

U.S. PATENT DOCUMENTS

| | | | |
|---|---|---|---|
| 2011/0008655 A1* | 1/2011 | White | H01M 2/1055 |
| | | | 429/62 |
| 2011/0064993 A1 | 3/2011 | Ochi | |
| 2011/0195288 A1 | 8/2011 | Harima et al. | |
| 2011/0274964 A1* | 11/2011 | Tuffile | H01M 2/0212 |
| | | | 429/156 |
| 2011/0293995 A1 | 12/2011 | Sasaki et al. | |
| 2013/0171485 A1 | 7/2013 | Kodera et al. | |
| 2015/0228942 A1 | 8/2015 | Shimoda et al. | |

FOREIGN PATENT DOCUMENTS

| | | |
|---|---|---|
| JP | 2010092598 A | 4/2010 |
| JP | 2011060623 A | 3/2011 |
| JP | 2012109275 A | 6/2012 |
| JP | 2012123946 A | 6/2012 |
| JP | 2013140707 A | 7/2013 |
| JP | 2014032924 A | 2/2014 |
| JP | 2014078366 A | 5/2014 |
| KR | 20120049840 A | 5/2012 |
| WO | 2010087472 A1 | 8/2010 |
| WO | 2011120667 A1 | 10/2011 |
| WO | 2014064888 A1 | 5/2014 |

* cited by examiner

BATTERY PACK TAB WELDING METHOD

TECHNICAL FIELD

The present invention relates to a method for welding tabs of a battery pack together.

BACKGROUND

As a battery pack comprising a plurality of battery cells, such a one as discussed in Patent Document 1 has been known. In the battery pack mentioned in Japanese Patent Application Publication No. 2011-60623, a plurality of battery cells having positive and negative electrode terminals formed of different metals are stacked, and adjacent electrode terminals are connected with each other by clad material metal plates.

Additionally, there is also known a film sheathed battery to which a laminated film is used, as discussed in Japanese Patent Application Publication No. 2014-32924. The film sheathed battery described in Japanese Patent Application Publication No. 2014-32924 is configured in a manner to draw positive and negative terminals (named as tabs) outward.

In a structure where a plurality of film sheathed batteries of Japanese Patent Application Publication No. 2014-32924 are stacked such that the positive terminal and the negative terminal are alternately aligned, if the positive terminal and the negative terminal of adjacent film sheathed batteries are connected through a clad material, the structure is provided to have a three-layer structure interposing a plate-like clad material between the positive terminal and the negative terminal. Accordingly, when attempting to connect both of the two terminals to the clad material by applying a laser only from the side of either one of the terminals, there has arisen a problem that the intensity of the laser becomes weakened before the laser reaches a bonding surface formed between the other terminal and the clad material due to dispersion of the laser beam and the like.

The present invention was established based on the above-mentioned problem, and the object of which is to provide a battery pack tab welding method which can reliably bond tabs to the both surfaces of clad material.

SUMMARY

In welding a positive electrode tab and a negative electrode tab in a battery pack configured by stacking a plurality of single cells each of which has positive and negative electrode tabs drawn outward and formed of metals different from each other in kind, the positive and negative electrode tabs being welded through a clad material including layers formed of the different kind of metals, respectively, the present invention is adapted to so superimpose a positive electrode tab of a first single cell, a negative electrode tab of a second single cell adjacent to the first single cell and a clad material that the same kind of metals are in contact with each other, and adapted to apply a laser from one of directions crossing the principal surfaces of the positive electrode tab and the negative electrode tab and the clad material thereby bonding one of the tabs to the clad material, while applying another laser from the opposite direction thereby bonding the other of the tabs to the clad material.

An aspect of the present invention resides in a battery pack tab welding method for welding a positive electrode tab and a negative electrode tab in a battery pack comprising a plurality of single cells stacked and each of which has positive and negative electrode tabs drawn outward and formed of metals different from each other in kind, the positive and negative electrode tabs being welded through a clad material comprising layers formed of the different kind of metals, respectively, the method comprising the steps of: aligning a positive electrode tab of a first single cell, a negative electrode tab of a second single cell adjacent to the first single cell, and a clad material so that the same kind of metals are in contact with each other; and applying a laser from one of directions crossing the principal surfaces of the positive electrode tab and the negative electrode tab and the clad material thereby bonding one of the tabs to the clad material, while applying another laser from the other direction thereby bonding the other of the tabs to the clad material.

DETAILED DESCRIPTION OF THE EMBODIMENTS

Figure 1:
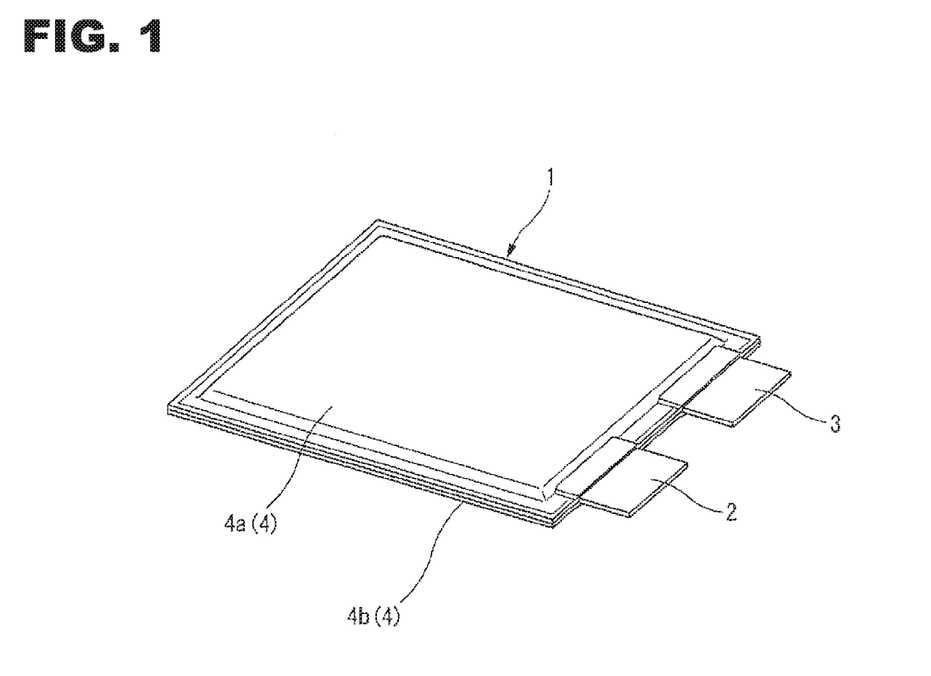
FIG. 1 is a perspective view showing a general structure of a laminate type lithium ion secondary battery as an example of a single cell.

Referring now to FIGS. 1 to 4, an embodiment of a battery pack according to the present invention will be discussed. FIG. 1 shows a general structure of a laminate type lithium ion secondary battery 1 as an example of a film sheathed battery to which a battery pack tab welding method according to the present invention is applied. This secondary battery 1 (hereinafter referred to as merely "a single cell") is used as a single cell constituting a lithium ion battery pack for electric-powered vehicles, for example.

As shown in FIG. 1, single cell 1 is accommodated and sealed in a rectangularly-shaped laminate film sheath material 4 composed of upper and lower two sheets of laminated films 4a, 4b, in a state where positive electrode tab 2 as a positive side electrode terminal and negative electrode tab 3 as a negative side electrode terminal are drawn outward. Incidentally, tabs 2 and 3 correspond to positive-side and negative-side collectors housed inside single cell 1, respectively, and formed of different kinds of metals. For example, positive electrode tab 2 is formed of aluminum while negative electrode tab 3 is formed of copper. By stacking a plurality of the thus configured flat single cells 1 and then bonding the tabs 2, 3, a battery pack is provided.

Figure 2:
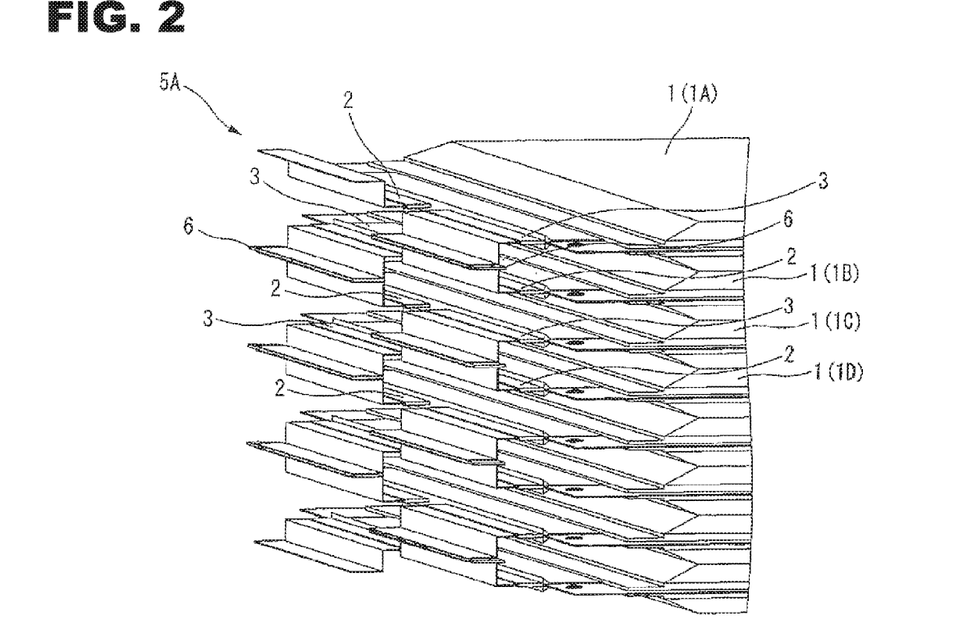
FIG. 2 is a perspective view for showing a first embodiment of a battery pack tab welding method according to the present invention.

FIG. 2 is a view of battery pack 5A obtained by stacking a plurality of single cells 1 in such a manner as to arrange positive electrode tab 2 and negative electrode tab 3 alternately with each other in the stacking direction. The stacked two or more single cells 1 each are named as first single cell 1A, second single cell 1B, third single cell 1C etc. in order from above. In an example as shown in FIG. 2, negative electrode tab 3 of first single cell 1A is bonded to positive electrode tab 2 of second single cell 1B through clad material 6, and additionally, negative electrode tab 3 of second single cell 1B is bonded to positive electrode tab 2 of third single cell 1C through clad material 6. The bonding of tabs 2 and 3 is sequentially repeated in the stacking direction in a zigzag manner, thereby configuring series battery pack 5A. As clad material 6, a plate-like one obtained by integrally laminating aluminum and copper layers corresponding to the metal materials of tabs 2, 3 is employed.

Figure 3:
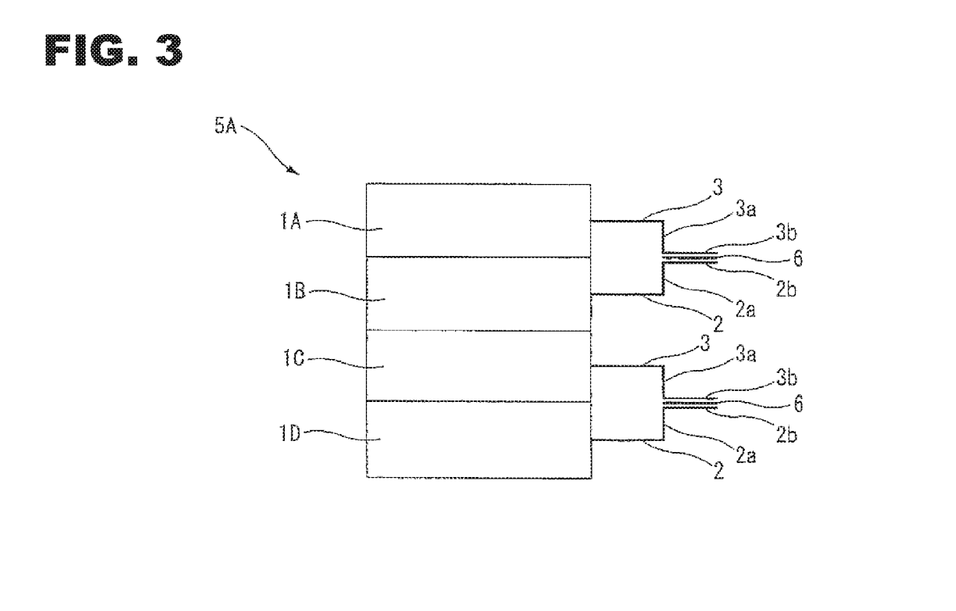
FIG. 3 is a schematic view of the battery pack as shown in FIG. 2.

FIG. 3 is a schematic view showing a connecting state in a tab alignment on one side of four single cells 1A to 1D of series battery pack 5A of FIG. 2. As shown in FIG. 3, negative electrode tab 3 of first single cell 1A is shaped bent downward to form bent portion 3a, and flange portion 3b is provided generally horizontally extending from bent portion 3a. Positive electrode tab 2 of adjacent second single cell 1B is shaped bent upward to form bent portion 2a, and flange portion 2b is provided generally horizontally extending from bent portion 2a. Then, flange portion 3b of negative electrode tab 3 and flange portion 2b of positive electrode tab 2 are bonded to each other through clad material 6.

Figure 4:
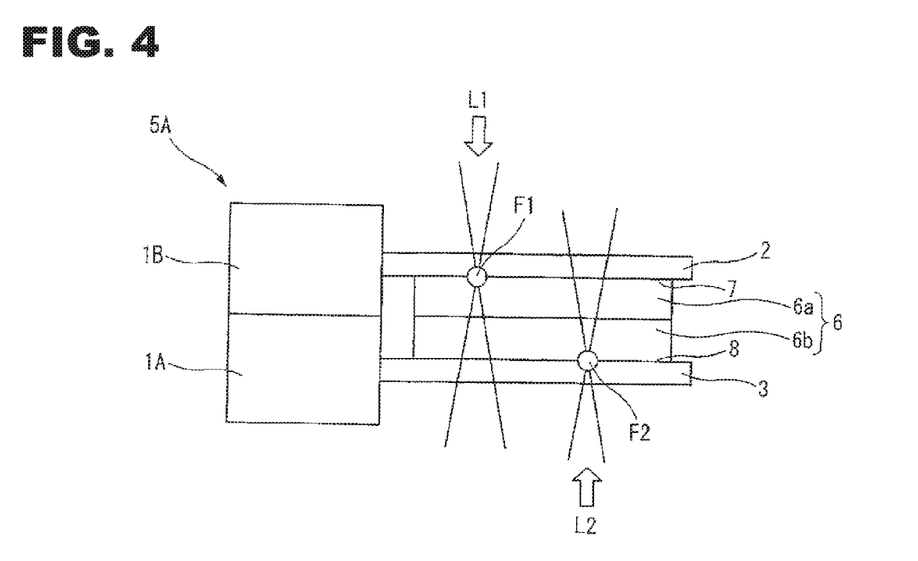
FIG. 4 is a view illustrating a method for welding the tabs to the clad material of FIG. 2.

FIG. 4 is a view illustrating a method for welding each of positive electrode tab 2 of second single cell 1B and the negative electrode tab 3 of first single cell 1A as show in FIG. 3 to clad material 6. First of all, clad material 6 is inserted between positive electrode tab 2 of second single cell 1B and the negative electrode tab 3 of first single cell 1A, followed by superimposing them on each other. When placing clad material 6, aluminum layer 6a of clad material 6 is faced toward the side of positive electrode tab 2 while copper layer 6b of clad material 6 is faced toward the side of negative electrode tab 3; in other words, clad material 6 is so disposed between positive electrode tab 2 and negative electrode tab 3 that the same kind of metals are in contact with each other. Thereafter, with a laser welder (not illustrated), focal point F2 is aimed at interface 8 formed between negative electrode tab 3 and clad material 6 (i.e. copper layer 6b), followed by applying laser L2 thereto from the side of negative electrode tab 3. This laser irradiation is performed along the direction perpendicular to the principal surfaces of tabs 2, 3 and that of clad material 6. More specifically, focal point F2 is aimed at interface 8 formed between negative electrode tab 3 and clad material 6 and then laser L2 is applied thereto, followed by running laser L2 in the direction parallel with the principal surface to achieve a linear laser welding along interface 8. Thus, negative electrode tab 3 and copper layer 6b of clad material 6 are bonded to each other. Next, upon turning the workpiece upside down or changing the location of the laser welder, focal point F1 is aimed at interface 7 formed between positive electrode tab 2 and clad material 6 (i.e. aluminum layer 6a), followed by applying laser L1 thereto from the side of positive electrode tab 2. This laser irradiation is performed along the direction perpendicular to the principal surfaces of tabs 2, 3 and that of clad material 6 and in the direction opposite to the direction of the initial laser (L2) irradiation. More specifically, focal point F1 is aimed at interface 7 formed between positive electrode tab 2 and clad material 6 and then laser L1 is applied thereto, followed by running laser L1 in the direction parallel with the principal surface to achieve a linear laser welding along interface 7. Thus, positive electrode tab 2 and aluminum layer 6a of clad material 6 are bonded to each other. In the above-mentioned example, laser irradiation is carried out under a condition of stacking a plurality of single cells 1A, 1B where positive electrode tab 2 and negative electrode tab 3 and clad material 6 are so overlaid that the same kind of metals are brought into contact with each other.

Incidentally, irradiation of laser L1 from the side of positive electrode tab 2 and irradiation of laser L2 from the side of negative electrode tab 3 may be performed simultaneously by using two laser welder on both sides.

Moreover, it is also possible to bond either one of positive electrode tab 2 and negative electrode tab 3 of each single cell to clad material 6 and then stack a plurality of such single cells and then bond the other of positive electrode tab 2 and negative electrode tab 3 to clad material 6. In this case, a plurality of single cells 1A may mutually independently be subjected to bonding between negative electrode tab 3 (copper: a higher melting point side) and clad material 6, followed by stacking the single cells A, and then bonding between positive electrode tab 2 (aluminum: a lower melting point side) and clad material 6 may successively be performed. Since bonding between positive electrode tab 2 and clad material 6 (which bonding can be attained at a low melting point and a short bonding time) is successively performed in the state of aligning a plurality of single cells 1A (each of which has already completed the bonding between negative electrode tab 3 and clad material 6) in the stacking direction, the time required for stacking operation can be shortened and the production efficiency can be improved.

By applying laser from both the side of positive electrode tab 2 and the side of negative electrode tab 3, it becomes possible to strongly bond positive electrode tab 2 to clad material 6 at interface 7 formed therebetween while strongly bonding negative electrode tab 3 to clad material 6 at interface 8 formed therebetween.

Furthermore, in the method for welding tabs 2, 3 to clad material 6 as shown in FIG. 4, first focal point F1 (i.e. a point welded by laser L1) and second focal point F2 (i.e. a point welded by laser L2) are disposed so as not to coincide with each other when viewed in perspective from the side of either one of tabs. With this, it is possible to suppress the event that a compound is formed from different kinds of metals in the interior of the clad material thereby bringing about the generation of brittle metal or the increase of conductive resistance. Namely, if one location is irradiated with laser for a long period of time, different kinds of metals are melted concurrently to form a compound therebetween, so that the fear of brittle metal generation or conductive resistance increase should arise; however, by so disposing the point welded by laser L1 and the point welded by laser L2 as not to coincide with each other as discussed above, it becomes possible to avoid such an event.

In general, a tab formed of a highly heat-conductive metal (e.g. copper) does not melt at low temperatures, and therefore required to be subjected to laser irradiation at relatively high temperatures. However, when laser irradiation is conducted at high temperatures, heat generated by the laser irradiation may adversely reach the interior of single cell 1. Hence a high temperature laser irradiation is preferably performed at a position as far as possible from the main body of single cell 1. In the case of displacing the point welded by laser L1 and the point welded by laser L2 from each other as mentioned above, it is preferable to conduct a laser irradiation on a tab formed of a highly heat-conductive metal at a location relatively close to the main body of single cell 1 while conducting a laser irradiation on the other tab formed of a low heat-conductive metal at a location relatively far from the main body of single cell 1. In the example as shown in FIG. 3, laser L1 is applied to aluminum positive electrode tab 2 at a location closer to the main body of single cell 1 since aluminum has a heat conductivity higher than that of copper, and on the other hand, laser L2 is applied to copper negative electrode tab 3 at a location farther from the main body of single cell 1 than laser L1.

FIG. 5A to FIG. 5D are views illustrating some examples of irradiation tracks of laser beams obtained by employing the battery pack tab welding method according to the present invention. In FIG. 5A to FIG. 5D, though the irradiation tracks of laser beams are indicated by solid lines and broken lines, these lines do not mean that the laser irradiation is carried out continuously or interruptedly but merely illustrate the laser beam tracks schematically. The solid lines indicate irradiation track 9 of laser L1 applied from one side while the broken lines indicate irradiation track 10 of laser L2 applied from the other side. Incidentally, clad material 6 disposed between positive electrode tab 2 and negative electrode tab 3 is omitted from FIG. 5 in order to simplify the drawings.

Figure 5A:
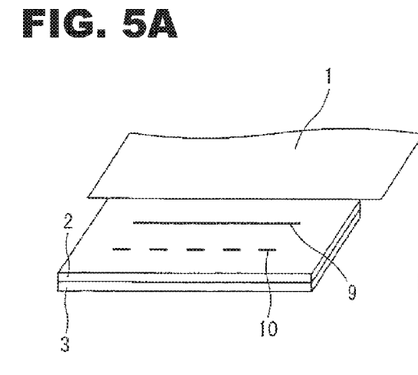
FIG. 5A-FIG. 5D are views for showing irradiation tracks of laser beams applied from both sides.
Figure 5B:
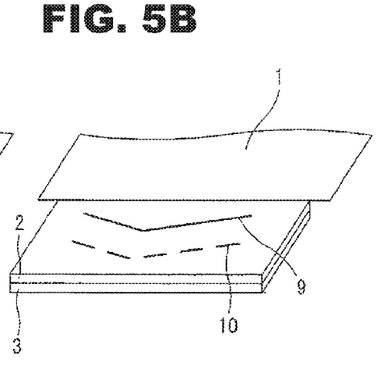
Figure 5C:
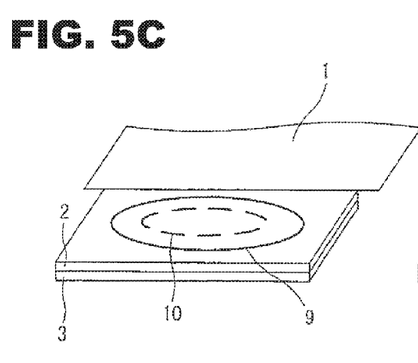
Figure 5D:
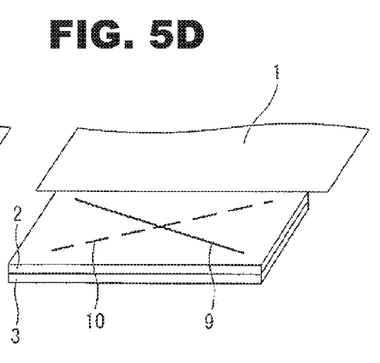

In FIG. 5A, irradiation track 9 of laser L1 and irradiation track 10 of laser L2 are drawn linearly and substantially parallel with each other. In FIG. 5B, irradiation track 9 of laser L1 and irradiation track 10 of laser L2 are shaped into the letter V, and substantially parallel with each other. In FIG. 5C, irradiation track 9 of laser L1 and irradiation track 10 of laser L2 are elliptically shaped and create a double circle where irradiation track 9 is disposed outside irradiation track 10. Additionally, in FIG. 5D, irradiation track 9 of laser L1 and irradiation track 10 of laser L2 are drawn linearly and intersect with each other so as to take the shape of the letter X. However, irradiation track 9 of laser L1 and irradiation track 10 of laser L2 are not limited to the examples as shown in FIGS. 5A to 5D and can take any other embodiments unless irradiation track 9 of laser L1 and irradiation track 10 of laser L2 are located coincident with each other. Irradiation track 9 of laser L1 and irradiation track 10 of laser L2 of FIG. 5 overlaps at their intersection, but this brings about no substantial problem because the major portions of them are not overlapped. However, from the viewpoint of controlling the conductive resistance, it is preferable that irradiation track 9 of laser L1 and irradiation track 10 of laser L2 are not overlapped even at a part thereof.

Figure 6:
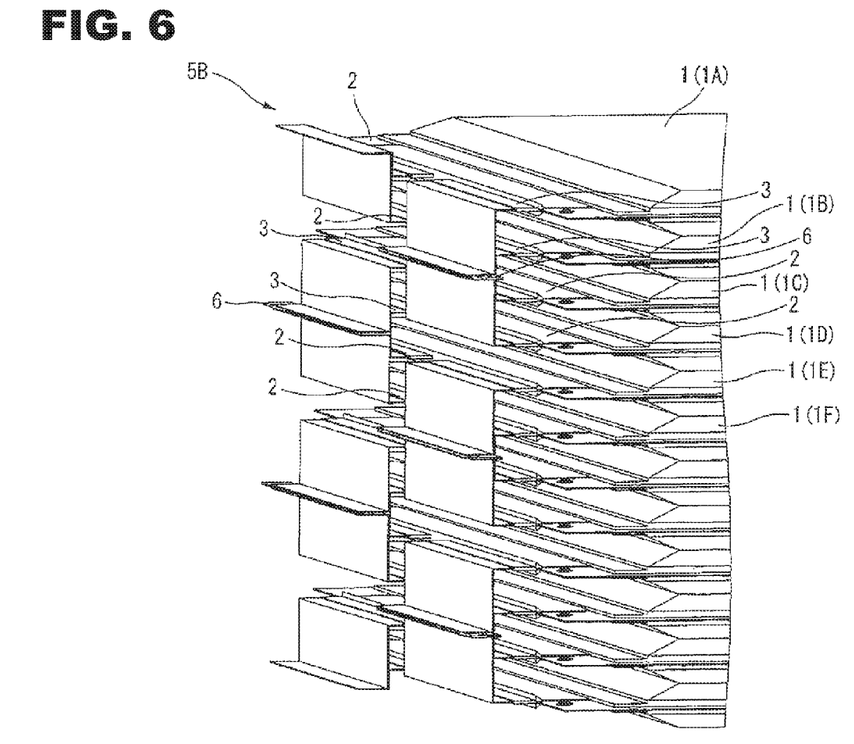
FIG. 6 is a perspective view for showing a second embodiment of a battery pack tab welding method according to the present invention.

FIG. 6 is a view for showing a second embodiment of a battery pack tab welding method according to the present invention, in which battery pack 5B provided by stacking a plurality of single cells 1 such that a pair of positive electrode tabs 2, 2 and a pair of negative electrode tabs 3, 3 are aligned in the stacking direction alternately with each other is illustrated. As shown in FIG. 6, negative electrode tab 3 of first single cell 1A is connected to positive electrode tab 2 of fourth single cell 1D through clad material 6, and additionally, negative electrode tab 3 of second single cell 1B is connected to negative electrode tab 3 of first single cell 1A while positive electrode tab 2 of third single cell 1C is connected to positive electrode tab 2 of fourth single cell 1D through clad material 6. Such a connection among tabs 2, 2, 3, and 3 are also adopted to negative electrode tabs 3, 3 of third and fourth single cells 1C, 1D and positive electrode tabs 2, 2 of fifth and sixth single cells 1E, 1F and sequentially repeated in the stacking direction in a zigzag manner, thereby configuring battery pack 5B where arrangements each of which consists of two single cells connected in parallel are connected in series.

Figure 7:
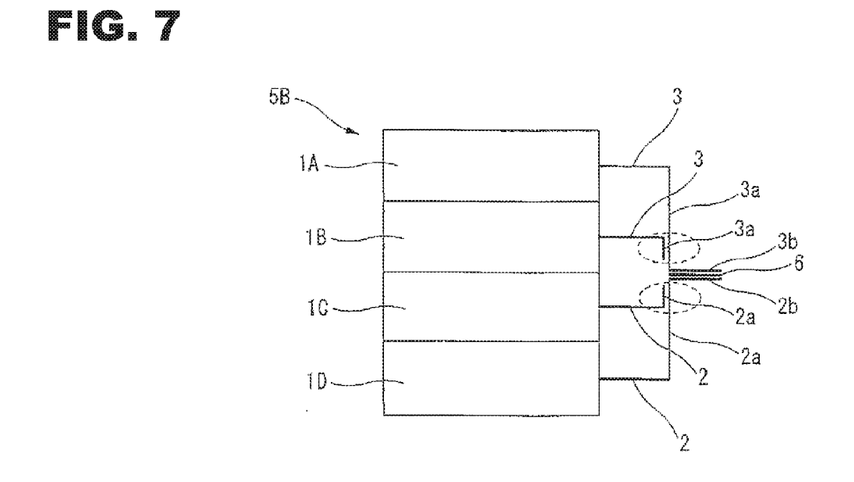
FIG. 7 is a schematic view of the battery pack as shown in FIG. 6.

FIG. 7 is a schematic view showing a connecting state in a tab alignment on one side of four single cells 1A to 1D of battery pack 5B of FIG. 6. In the example as shown in FIG. 7, negative electrode tab 3 of first single cell 1A and positive electrode tab 2 of fourth single cell 1D are shaped bent to form bent portions 3a, 2a and flange portions 3b, 2b, respectively, in a similar matter to the method as shown in FIG. 3, and bonded to each other at their flange portions 3b, 2b through clad material 6. Moreover, negative electrode tab 3 of second single cell 1B is bent in the same direction as negative electrode tab 3 of first single cell 1A is bent, thereby forming bent portion 3a. Then, bent portion 3a of negative electrode tab 3 of second single cell 1B is connected to bent portion 3a of negative electrode tab 3 of first single cell 1A. Meanwhile, positive electrode tab 2 of third single cell 1C is bent in the same direction as positive electrode tab 2 of fourth single cell 1D is bent, thereby forming bent portion 2a. Then, bent portion 2a of positive electrode tab 2 of third single cell 1C is connected to bent portion 2a of positive electrode tab 2 of fourth single cell 1A.

Figure 8:
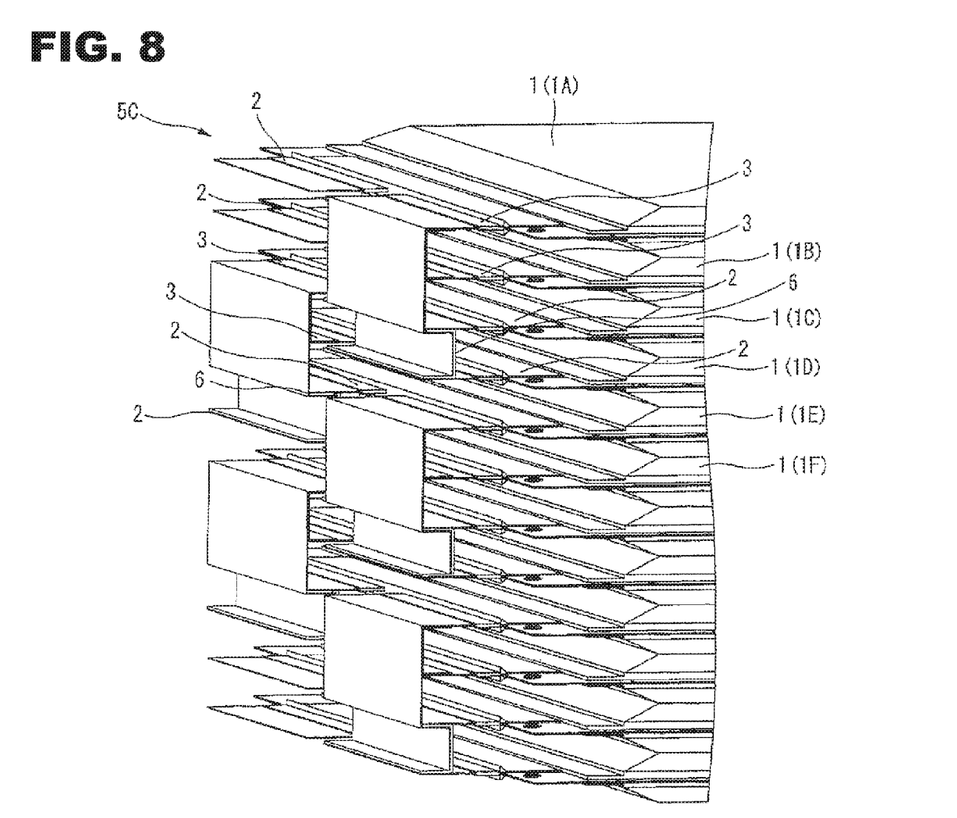
FIG. 8 is a perspective view for showing a third embodiment of a battery pack tab welding method according to the present invention.

FIG. 8 is a view for showing a third embodiment of a battery pack tab welding method according to the present invention, in which battery pack 5C provided by stacking a plurality of single cells 1 such that a pair of positive electrode tabs 2, 2 and a pair of negative electrode tabs 3, 3 are aligned in the stacking direction alternately with each other is illustrated. In the example as shown in FIG. 8, negative electrode tab 3 of first single cell 1A is connected to positive electrode tab 2 of third single cell 1C and positive electrode tab 2 of fourth single cell 1D through U-shaped clad material 6, and additionally, negative electrode tab 3 of second single cell 1B is connected to negative electrode tab 3 of first single cell 1A. Such a connection among tabs 2, 2, 3, and 3 are also adopted to negative electrode tabs 3, 3 of third and fourth single cells 1C, 1D and positive electrode tabs 2, 2 of fifth and sixth single cells 1E, 1F and sequentially repeated in the stacking direction in a zigzag manner, thereby configuring battery pack 5C where arrangements each of which consists of two single cells connected in parallel are connected in series like the example as shown in FIG. 6.

Figure 9:
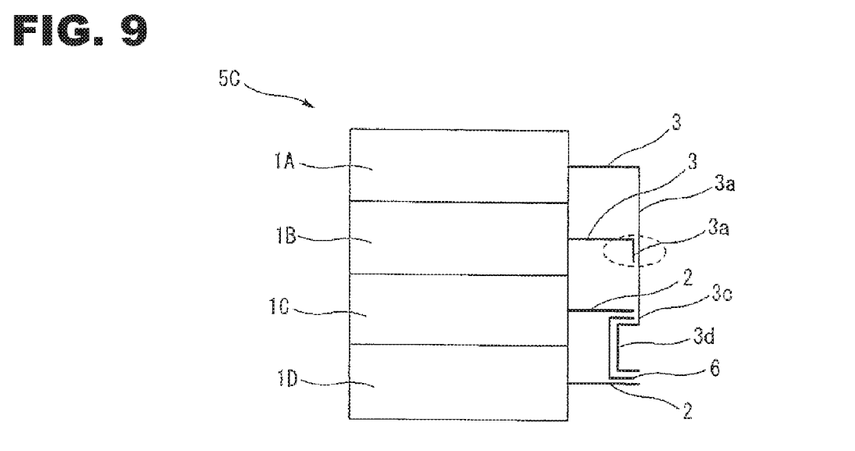
FIG. 9 is a schematic view of the battery pack as shown in FIG. 8.

FIG. 9 is a schematic view showing a connecting state in a tab alignment on one side of four single cells 1A to 1D of battery pack 5C of FIG. 8. As shown in FIG. 9, negative electrode tab 3 of first single cell 1A is shaped bent downward to form bent portion 3a. This bent portion 3a has end portion 3c at its one end side, and end portion 3c has U-shaped portion 3d opening toward the side opposite to the main body of single cell 1. This U-shaped portion 3d is connected to both positive electrode tab 2 of third single cell 1C and positive electrode tab 2 of fourth single cell 1D, through clad material 6 so shaped like the letter U as to follow the shape of U-shaped portion 3d. Moreover, negative electrode tab 3 of second single cell 1B is bent in the same direction as negative electrode tab 3 of first single cell 1A is bent, thereby forming bent portion 3a. This bent portion 3a of negative electrode tab 3 of second single cell 1B is connected to bent portion 3a of negative electrode tab 3 of first single cell 1A.

Though in the above-mentioned embodiments a lithium ion secondary battery is adopted as an example of a film sheathed battery and a tab welding method for the lithium ion secondary battery is discussed, a battery targeted by the present invention is not necessarily limited to the film sheathed battery.

The invention claimed is:

1. A battery pack tab welding method for welding a positive electrode tab and a negative electrode tab in a battery pack, the battery pack comprising a plurality of single cells stacked, each of which has positive and negative electrode tabs drawn outward and formed of metals different from each other in kind, the positive and negative electrode tabs being welded through a clad material comprising layers formed of the different kind of metals, respectively, the method comprising the steps of:

aligning a positive electrode tab of a first single cell, a negative electrode tab of a second single cell adjacent to the first single cell, and a clad material so that the same kind of metals are in contact with each other; and applying a laser from one of directions crossing the principal surfaces of the positive electrode tab and the negative electrode tab and the clad material thereby bonding one of the tabs to the clad material, while applying another laser from the other direction thereby bonding the other of the tabs to the clad material.

2. A battery pack tab welding method as claimed in claim 1, wherein the laser is applied in the state of stacking a plurality of single cells where the positive electrode tab, the negative electrode tab and the clad material are so superimposed that the same kind of metals are in contact with each other.

3. A battery pack tab welding method as claimed in claim 1, wherein a first focal point of the laser applied from the one direction and a second focal point of the laser applied from the other direction do not coincide with each other when viewed in perspective from the side of either one of the tabs.

4. A battery pack tab welding method as claimed in claim 3, wherein the laser irradiation on either one of the positive electrode tab and the negative electrode tab formed of a higher heat-conductive metal is conducted at a location closer to the main body of the single cell than a location of the laser irradiation on the other tab formed of a lower heat-conductive metal.

5. A battery pack tab welding method as claimed in claim 1, wherein a plurality of single cells are stacked after bonding one of the positive electrode tab and the negative electrode tab to the clad material, and then the other of the positive electrode tab and the negative electrode tab is bonded to the clad material.

* * * * *